(12) United States Patent
Zimet et al.

(10) Patent No.: US 6,716,262 B2
(45) Date of Patent: Apr. 6, 2004

(54) MOUNTING COLLAR FOR A FILTER BAG

(75) Inventors: Daniel B. Zimet, South Euclid, OH (US); Martin Warchola, Medina, OH (US)

(73) Assignee: The Scott Fetzer Company, Westlake, OH (US)

( * ) Notice: Subject to any disclaimer, the term of this patent is extended or adjusted under 35 U.S.C. 154(b) by 0 days.

(21) Appl. No.: 10/115,484

(22) Filed: Apr. 2, 2002

(65) Prior Publication Data

US 2003/0182908 A1 Oct. 2, 2003

(51) Int. Cl.⁷ .............................................. B01D 46/02
(52) U.S. Cl. ............................ 55/369; 55/361; 55/374; 55/375; 55/377; 55/378; 55/DIG. 2; 55/DIG. 3; 15/347
(58) Field of Search ......................... 55/361, 369, 374, 55/375, 377, 378, 381, DIG. 2, DIG. 3; 15/347

(56) References Cited

U.S. PATENT DOCUMENTS

| | | | |
|---|---|---|---|
| 2,528,332 A | 10/1950 | Bergquist | |
| 3,108,736 A | 10/1963 | Anderson et al. | |
| 3,283,481 A | 11/1966 | Studley et al. | |
| 3,330,100 A | 7/1967 | Fesco | |
| 3,383,030 A | 5/1968 | Downey | |
| 3,401,867 A | 9/1968 | Long et al. | |
| 3,495,386 A | 2/1970 | Bixler et al. | |
| 3,503,308 A | 3/1970 | Henry | |
| 3,572,017 A | 3/1971 | Terzuoli | |
| 3,751,881 A | 8/1973 | Hughes | |
| 3,929,437 A | 12/1975 | Gaudry | |
| 4,203,445 A | 5/1980 | Jessup et al. | |
| 4,274,847 A | * 6/1981 | Crener .................... | 55/DIG. 2 |
| 4,438,865 A | 3/1984 | Scattaregia | |
| 4,861,357 A | 8/1989 | Gavin et al. | |
| 5,039,324 A | 8/1991 | Goldberg | |
| 5,725,619 A | * 3/1998 | Brule et al. .............. | 55/DIG. 2 |
| 5,792,224 A | * 8/1998 | Fu et al. ................... | 55/DIG. 2 |
| 6,277,165 B1 | * 8/2001 | Lovett et al. ............ | 55/DIG. 2 |

* cited by examiner

*Primary Examiner*—Minh-Chau T. Pham
(74) *Attorney, Agent, or Firm*—Jones Day

(57) ABSTRACT

A mounting collar is for supporting a vacuum cleaner filter bag in a mounted condition over a vacuum cleaner fill tube. The fill tube has a cylindrical outer surface. A panel of the mounting collar is configured to be attached to the filter bag. The panel has a first inner edge defining a first opening for receiving the fill tube. An elastomeric diaphragm of the collar extends across the first opening. The diaphragm has a second inner edge defining a second opening. The second inner edge is configured to be elastically stretched circumferentially about the fill tube and to be in contact with the cylindrical outer surface about the entire circumference of the cylindrical outer surface when the first opening receives the fill tube. A lobe of the diaphragm is defined by the second inner edge and a baseline. The baseline extends from a first point on the second inner edge to a second point on the second inner edge and is located entirely on the diaphragm.

18 Claims, 11 Drawing Sheets

MOUNTING COLLAR FOR A FILTER BAG

BACKGROUND

A filter bag collects debris that is removed from household surfaces by a vacuum cleaner. The filter bag has a mounting collar with an opening that provides access to the interior of the bag. The bag is removably mounted on a vacuum cleaner fill tube by insertion of the fill tube through the opening in the collar.

A prior art mounting collar 10 is shown in FIG. 1A adjacent a section of a vacuum cleaner fill tube 11. The collar 10 has a rigid frame 12 with an inner edge 14 defining an opening 16. The inner edge 14 defines a circle that is interrupted by the top and bottom ends 18 and 20 of a tab 22 that extends across the opening 16. The bottom end 20 of the tab 22 is narrow and thus easily torn away from the frame 14. An elastomeric diaphragm 24 located behind the tab 22 extends across the opening 16. The diaphragm 24 has a slit 26 in the shape of a figure eight, as shown in FIG. 1B.

The fill tube 11 can be inserted through the opening 16 of the frame 12 and through the slit 26 in the diaphragm 24. In this process, the tube 11 tears the bottom end 20 of the tab 22 away from the frame 12. The tab 22, pivoting about its top end 18, is pushed through the slit 26 of the diaphragm 24 along with the tube 11. As shown in FIG. 2, the diaphragm 24 is elastically engaged about the tube 11. The tab 22 is lodged in-between the tube 11 and the diaphragm 24.

SUMMARY

The present invention is a mounting collar for supporting a vacuum cleaner filter bag in a mounted condition over a vacuum cleaner fill tube. The fill tube has a cylindrical outer surface. A panel of the mounting collar is configured to be attached to the filter bag. The panel has a first inner edge defining a first opening for receiving the fill tube. An elastomeric diaphragm of the collar extends across the first opening. The diaphragm has a second inner edge defining a second opening. The second inner edge is configured to be elastically stretched circumferentially about the fill tube and to be in contact with the cylindrical outer surface about the entire circumference of the cylindrical outer surface when the first opening receives the fill tube. A lobe of the diaphragm is defined by the second inner edge and a baseline. The baseline extends from a first point on the second inner edge to a second point on the second inner edge and is located entirely on the diaphragm.

In an embodiment of the invention, the lobe is defined by a section of the second inner edge and the baseline, and the section is arcuate. The distance between any two points on the inner edge is less than the diameter of the fill tube. An infinite line containing the baseline does not extend across the second opening, and the height of the lobe is shorter than the length of the baseline in an original condition of the diaphragm. The entire area of the lobe is stretched and elastically pressed against the tube when the first opening receives the fill tube.

Preferably, the second opening includes a slit. The slit is defined by two sections of the edge that engage each other along their lengths in the original condition of the diaphragm. Two opposite ends of the slit are the most distantly separated locations on the slit. An infinite line containing the baseline does not extend across the second opening, and the slit does not extend into the lobe.

DESCRIPTION

Figure 1A:
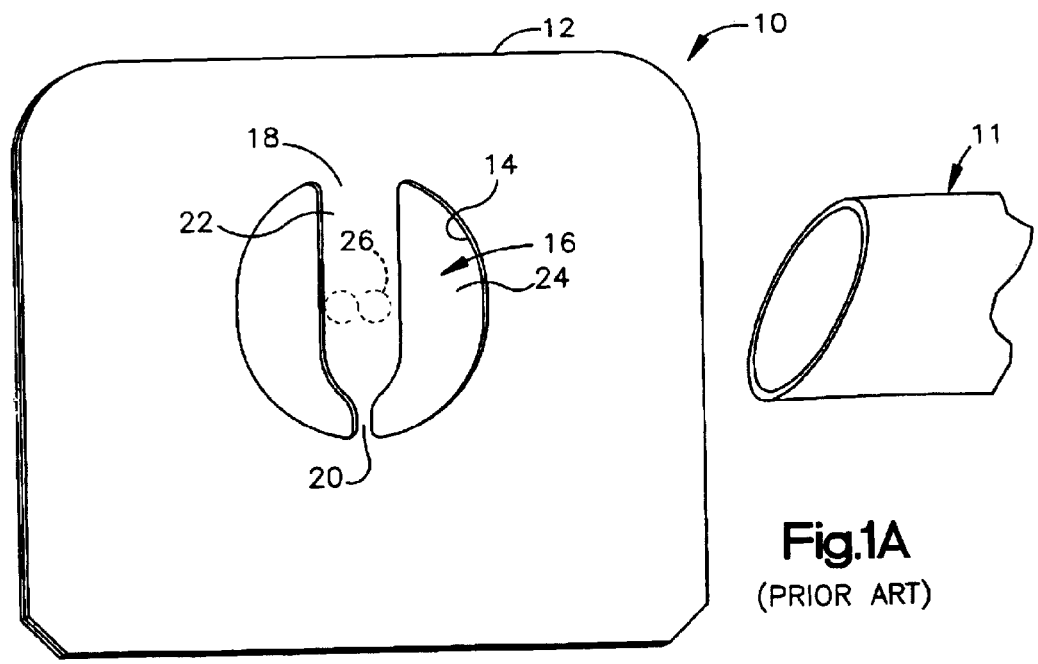
FIG. 1A is a view of a prior art apparatus.
Figure 1B:
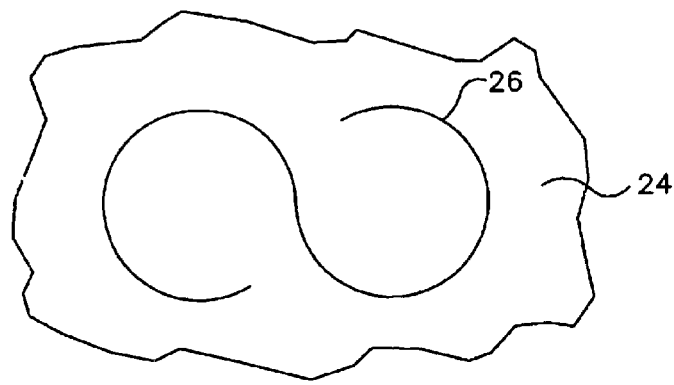
FIG. 1B is a partial enlarged view of a part shown in FIG. 1A.
Figure 2:
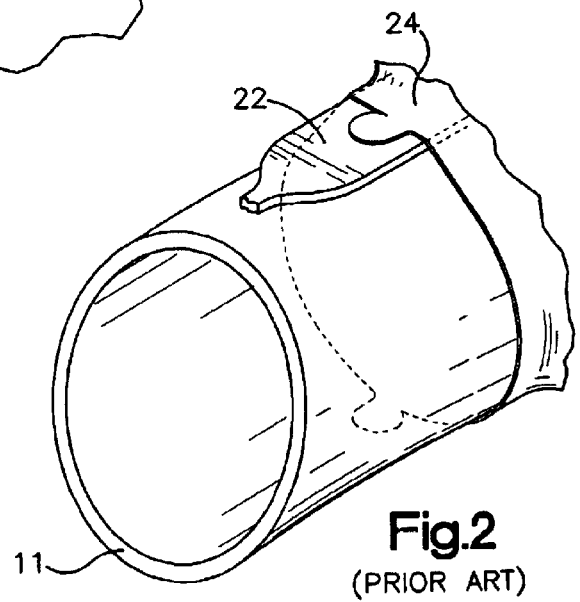
FIG. 2 is a view of the apparatus of FIG. 1 shown in another configuration.

The apparatus 100 shown in FIG. 3 has parts which, as described below, are examples of the elements recited in the claims.

The apparatus 100 includes a disposable vacuum cleaner filter bag 110. A mounting collar 116 on the filter bag 110 has an opening 117 that provides access to the interior 119 of the bag 110. The apparatus 100 also includes a fill tube 120, which is part of a vacuum cleaner. The bag 110 is removably mounted on the fill tube 120 by insertion of the fill tube 120 through the collar opening 117. In operation, the vacuum cleaner exhausts dirt laden air through the fill tube 120 into the bag 110.

The fill tube 120 includes a cylindrical section 122 centered on an axis 123. An abutment plate 124 extends radially outward from the cylindrical section 122 about the full circumference of the cylindrical section 122. First and second projections 126 and 127 project radially outward from diametrically opposite sides of the cylindrical section 122. A front edge 128 of the cylindrical section 122 defines an opening 130 through which dirt laden air exits the fill tube 120. The front edge 128 is nonplanar. Specifically, the side sections 132 and 134 of the front edge 128, which are adjacent the projections 126 and 127, extend forward beyond the top and bottom sections 136 and 138 of the front edge 128.

The filter bag 110 is formed of layers of paper and melt blown polypropylene. As shown in FIG. 4, the bag 110 has a star-shaped perforation 140. The perforation 140 can be torn open to provide access to the interior 119 of the bag 110 when the tube 120 (FIG. 3) is inserted through the opening 117.

The mounting collar 116 extends across the bag perforation 140. The collar 116 has a rigid panel 142 that is adhered to the bag 110. The panel 142 is formed of two paperboard plates 144 and 146 that are adhered together.

Figure 3:
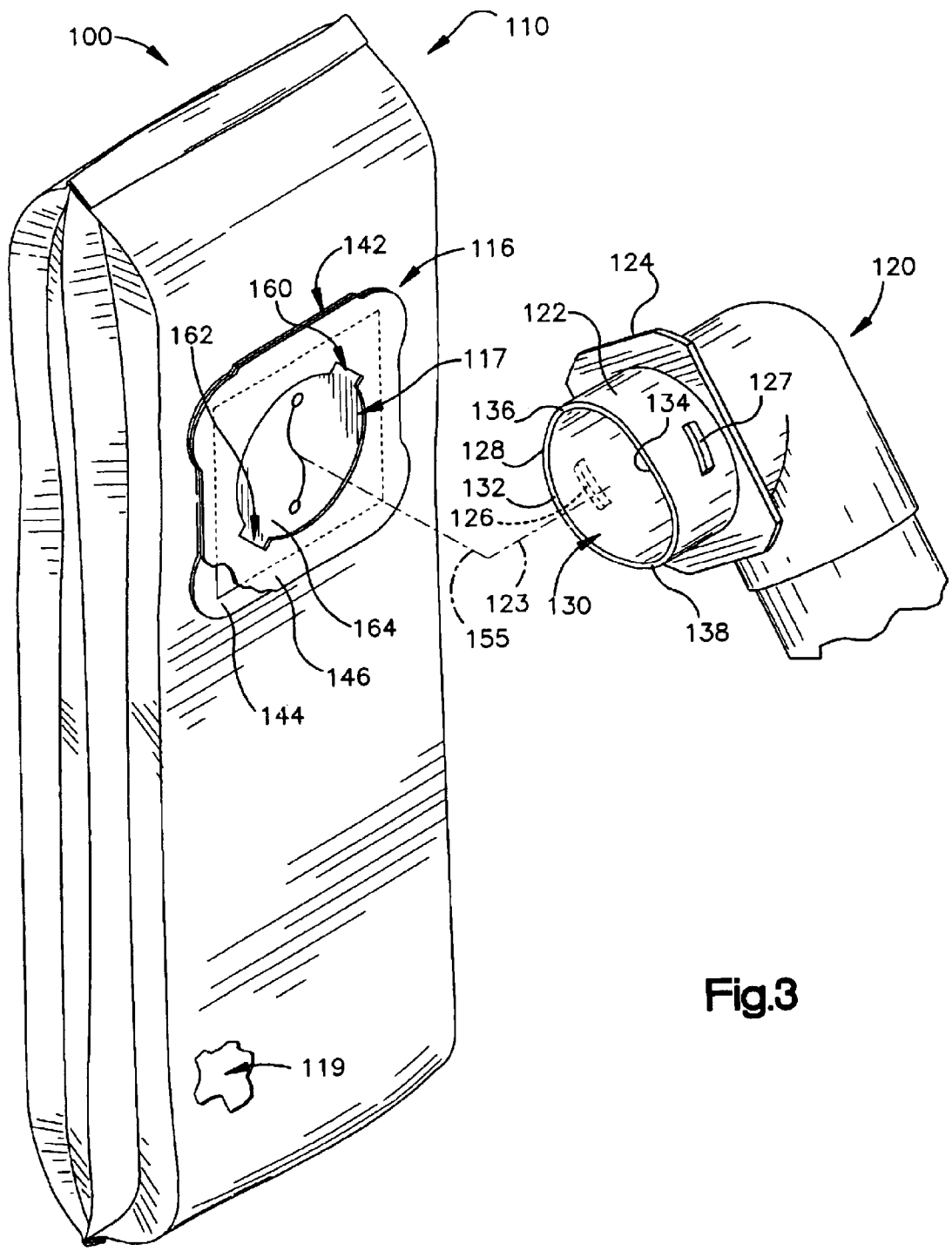
FIG. 3 is a perspective view of an apparatus comprising a first embodiment of the present invention.
Figure 4:
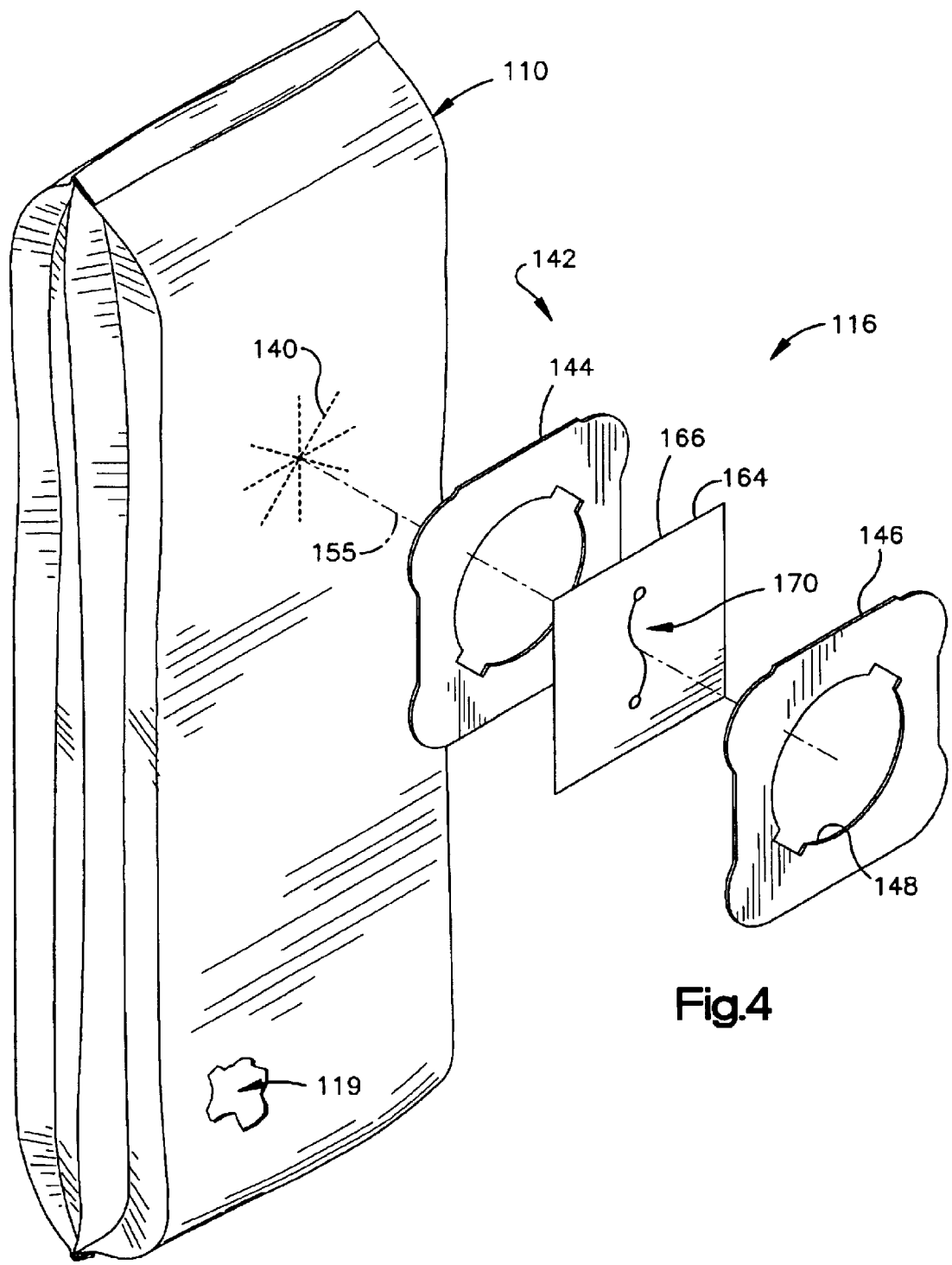
FIG. 4 is an exploded view of parts shown in FIG. 3.
Figure 5A:
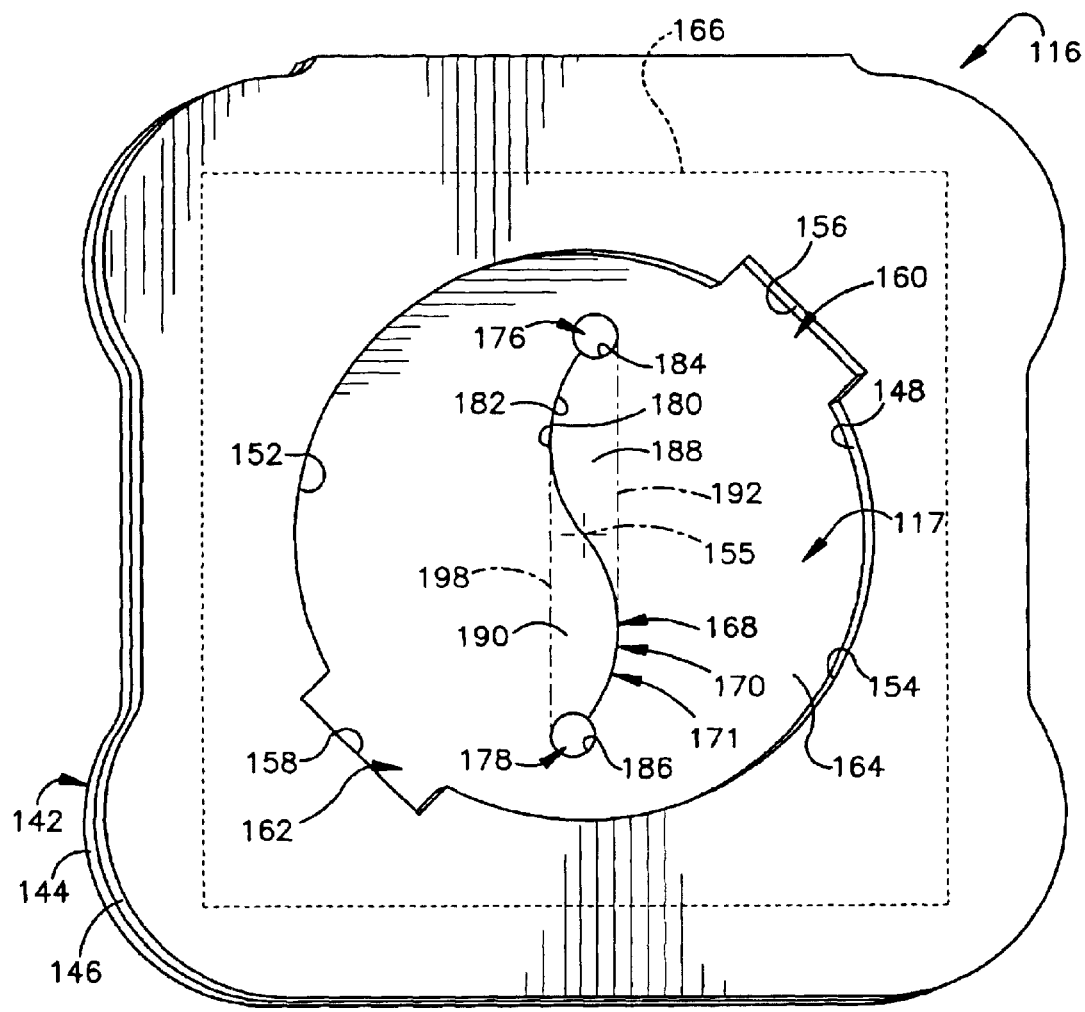
FIG. 5A is a front perspective view of parts shown in FIG. 3.

As shown in FIG. 5A, an inner edge 148 of the panel 142 defines the opening 117 in the collar 116 that provides access to the interior 119 of the bag 110 (FIG. 3). The inner edge 148 has two opposite circular portions 152 and 154 defining a circular shape centered on an axis 155. The circular portions 152 and 154 extend between two opposite rectangular portions 156 and 158 that define notches 160 and 162.

An elastomeric diaphragm 164 of the mounting collar 116 is adhered in place between the plates 144 and 146 of the panel 142 and extends across the panel opening 117. The diaphragm 164 has an outer edge 166 defining a square shape.

Figure 5B:
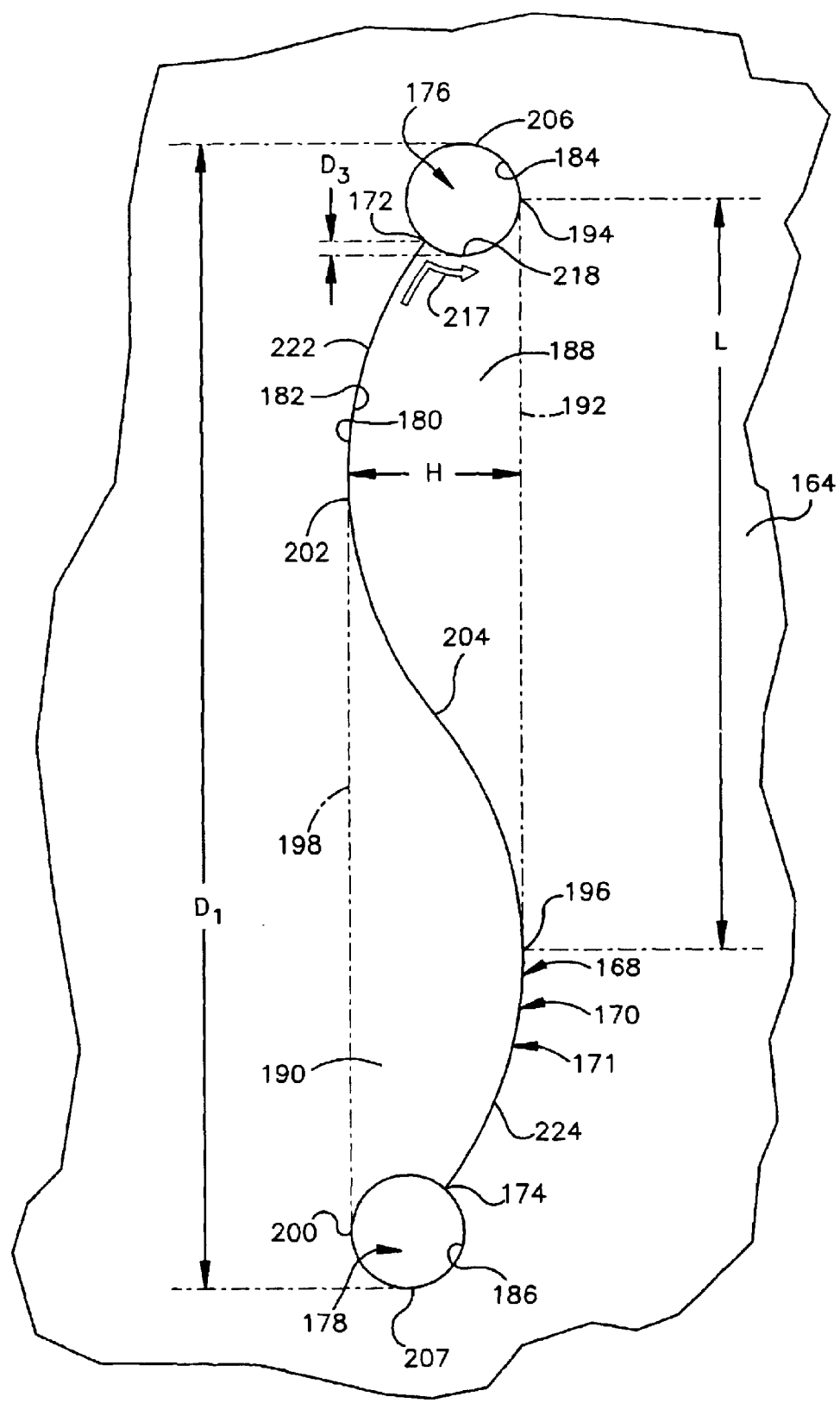
FIG. 5B is a partial enlarged view of a part shown in FIG. 5A.

As shown in FIG. 5B, an inner edge 168 of the diaphragm 164 defines an opening 170. In the original, unstretched, condition of the diaphragm 164 shown in FIG. 5B, the opening 170 includes a slit 171 extending lengthwise from a first end 172 of the slit 171 to an opposite second end 174 of the slit 171. The slit 171 is arcuate and, more specifically, S-shaped. The opposite ends 172 and 174 of the slit 171 are the most distantly separated points of the slit 171. The opening 170 also includes two fillet holes 176 and 178 adjoining the opposite ends 172 and 174 of the slit 171.

First and second sections 180 and 182 of the inner edge 168 oppose each other from opposite sides of the slit 171. Each section 180 and 182 extends from the first end 172 of the slit 171 to the opposite second end 174 of the slit 171. The sections 180 and 182 have contours that are complementary to each other. The sections 180 and 182 are arcuate and, more specifically, S-shaped. In the unstretched condition, the sections 180 and 182 preferably engage each other along their lengths so that the slit 171 is closed, as shown in FIG. 5B. This is in contrast to the sections 180 and 182 being spaced from each other, in which case the slit 171 is open. Third and fourth sections 184 and 186 of the inner edge 168 surround the fillet holes 176 and 178.

The diaphragm 164 has first and second lobes 188 and 190. The first lobe 188 is defined by the inner edge 168, specifically the first section 180 of the inner edge 168, and a first baseline 192. The first baseline 192 is an imaginary straight line extending from a first point 194 on the inner edge 168 to second point 196 on the inner edge 168. The first baseline 192 is located entirely on the diaphragm 164. Neither the first baseline 192, nor an infinite line containing the first baseline 192, extends across the opening 170. Although the slit 171 extends alongside the first lobe 188, it does not extend into the first lobe 188.

Similarly, the second lobe 190 is defined by the inner edge 168, specifically the second section 182 of the inner edge 168, and a second baseline 198. The second baseline 198 extends from a first point 200 on the inner edge 168 to a second point 202 on the inner edge 168. Like the first baseline 192, the second baseline 198 is located entirely on the diaphragm 164. Neither the second baseline 198, nor an infinite line containing the it, extends across the opening 170. Although the slit 171 extends alongside the second lobe 190, it does not extend into the second lobe 190. The second lobe 190 has the same size and shape as the first lobe 188, but with an inverted orientation relative to the first lobe 188. The lobes 188 and 190 are symmetric relative to each other about a central point 204 on the slit 171.

The diaphragm opening 170 is smaller than the outlet section 122 of the fill tube 120 (FIG. 3). This is explained as follows, with reference to the two most distantly separated points 206 and 207 on the inner edge 168. The distance $D_1$ between the most distantly separated points 206 and 207 is less than the outer diameter of the outlet section 122 of the fill tube 120 (FIG. 3). Thus, the distance between any two points on the inner edge 168 is less than the diameter of the outlet section 122. Consequently, the inner edge 168 must elastically lengthen to receive the fill tube 120 when the bag 110 is mounted on the fill tube 120.

Figure 6:
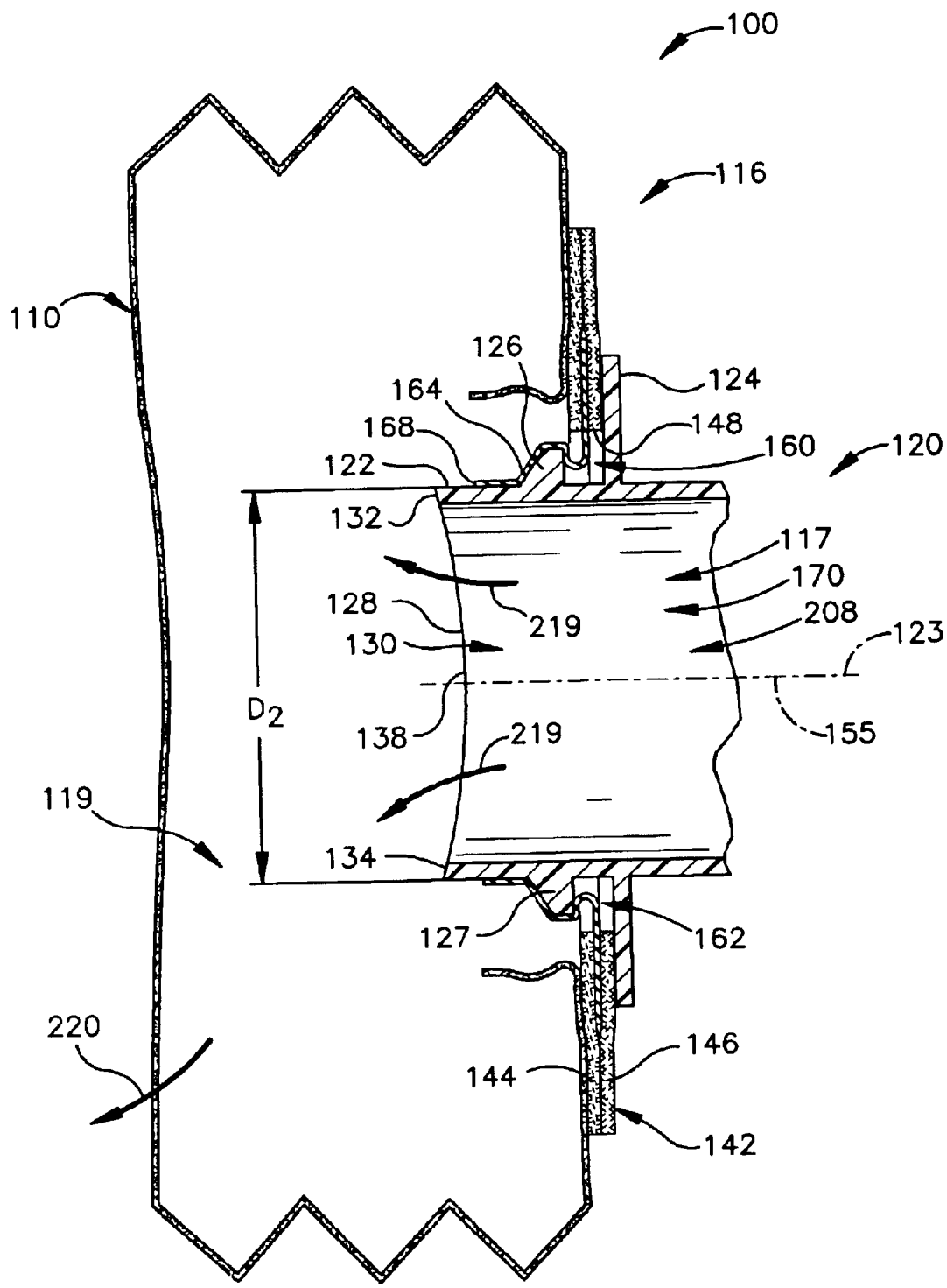
FIG. 6 is a top sectional view of the apparatus of FIG. 3 shown in another configuration.

Referring to FIG. 3, the bag 110 can be mounted on the fill tube 120 as follows. First, the fill tube 120 is located in front of the panel opening 117 and aligned such that the axis 123 of the fill tub 116 coincides with the axis 155 of the panel 142. The fill tube 120 is oriented such that the projections 126 and 127 are circumferentially aligned with the notches 160 and 162. As illustrated in FIG. 6, the fill tube 120 is inserted through the panel opening 117, through the diaphragm opening 170, and through a hole 208 in the bag 110. The hole 208 in the bag 110 is formed by tearing of the perforation 140 (FIG. 4), either through pressure from the fill tube 120 during insertion or by manually poking the perforation 140 open before insertion of the fill tube 120.

The fill tube 120 is inserted through the panel opening 117 until the projections 126 and 127 are located behind the panel 142, as shown in FIG. 6. To prevent the fill tube 120 from slipping out of the panel opening 117, the fill tube 120 is locked in place. This is done by rotating the fill tube 120 about the axis 123 to move the projections 126 and 127 circumferentially out of alignment with the notches 160 and 162. The panel 142 is then captured between the projections 126 and 127 and the abutment plate 124. The bag 110 is thus placed in the mounted condition.

As the fill tube 120 is inserted in the diaphragm opening 170, the panel 142 is not induced to bend. This is because the panel opening 117 is diametrically larger than the fill tube 120. Consequently, no portion of the panel 142 becomes lodged between the diaphragm 164 and the fill tube 120.

In contrast, the diaphragm opening 170 in its unstretched condition is smaller than the fill tube 120, as explained above. Consequently, the inner edge 168 of the diaphragm 164 is forced to elastically lengthen to receive the fill tube 120. The diaphragm opening 170 is thus transformed from a narrow slit 171 (FIG. 5A) to an orifice the size of the fill tube 120.

After the fill tube 120 is inserted through the diaphragm opening 170 and rotated to lock it in place, the diaphragm 164 is in a condition shown in FIGS. 7A–7D, in which the bag is omitted for clarity. The diaphragm 164 is elastically stretched circumferentially about the tube 120. This produces an elastic force that presses the diaphragm 164 against the fill tube 120 about the entire circumference of the fill tube 120. Since nothing intervenes between the fill tube 120 and the diaphragm 164, the diaphragm 164 is in contact with the surface 209 of the tube 120 about the entire circumference of the fill tube 120. A seal is thus formed between the diaphragm 164 and the fill tube 120. The seal inhibits dirt from escaping from the bag 110.

As shown in FIGS. 7A–7D, the lobes 188 and 190 are circumferentially aligned with, and axially adjacent to, the tube projections 126 and 127. This places more diaphragm material where it is needed most—adjacent to the projections 126 and 127. The lobes 188 and 190 are also circumferentially aligned with the most forward extending portions 132 and 134 of the front edge 128 of the fill tube 120. This helps to prevent the lobes 188 and 190 from extending beyond the front edge 128 of the tube 120 and partially covering the tube opening 130.

Figure 7A:
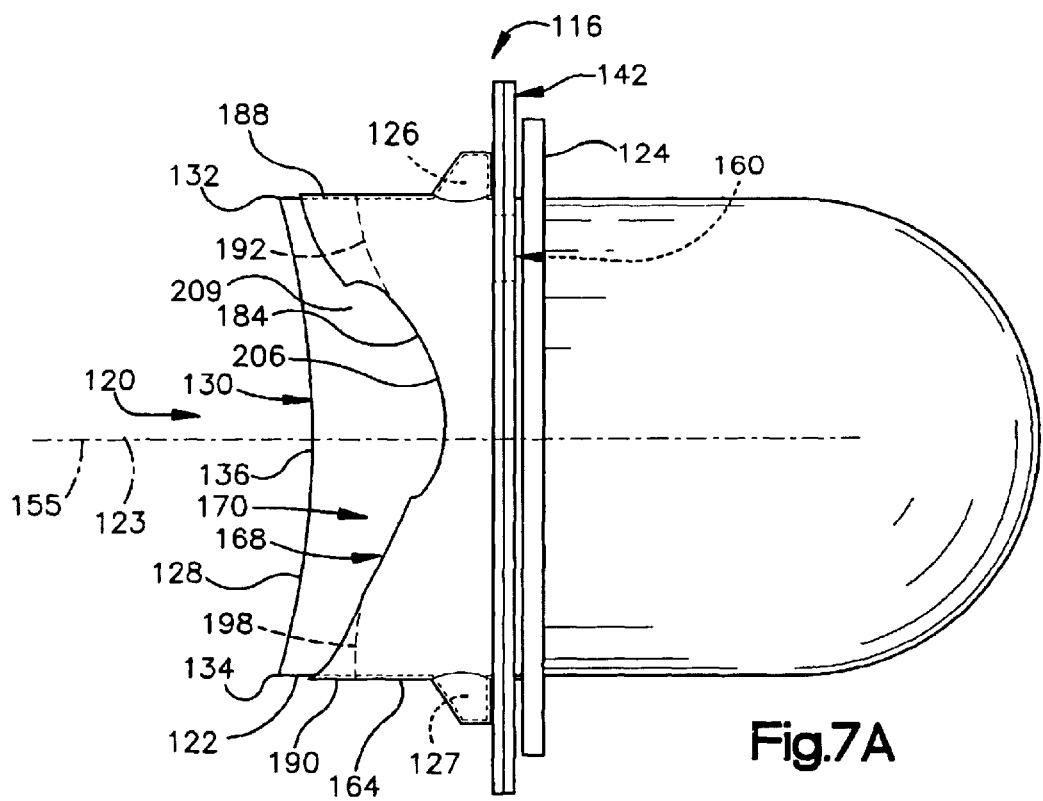
FIG. 7A is a top view of the apparatus of FIG. 6.
Figure 7B:
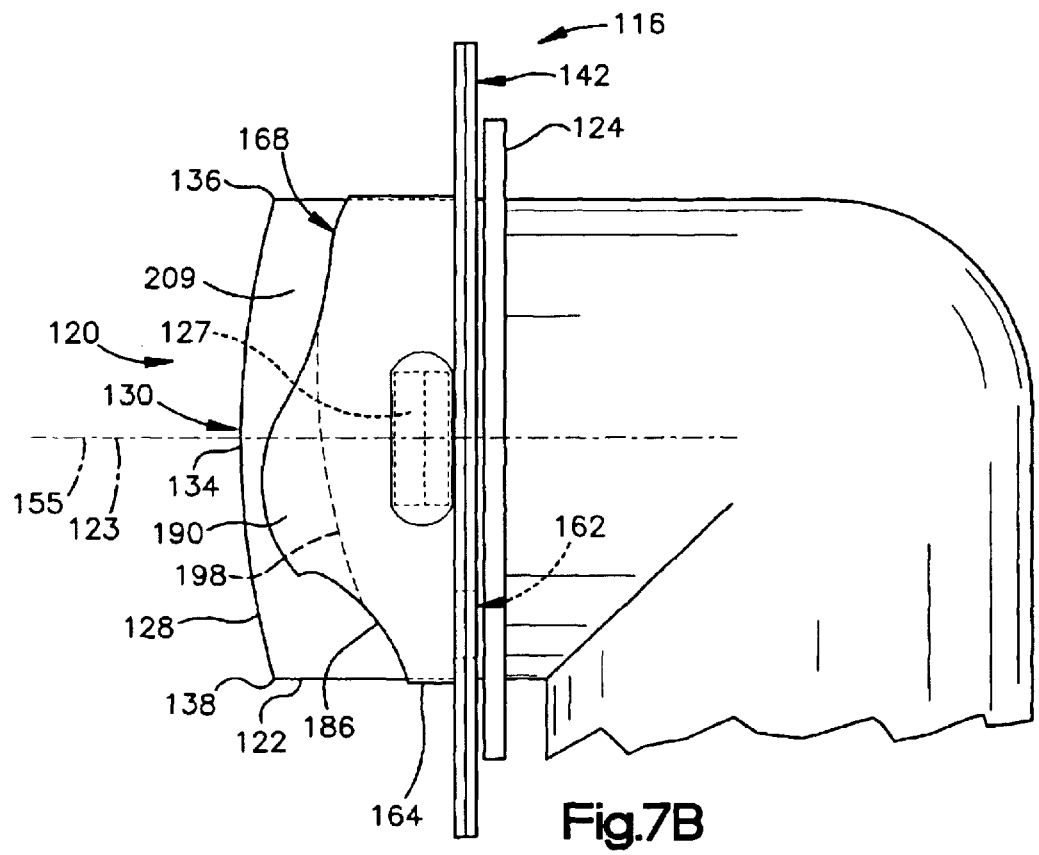
FIG. 7B is a side view of the apparatus of FIG. 6.
Figure 7C:
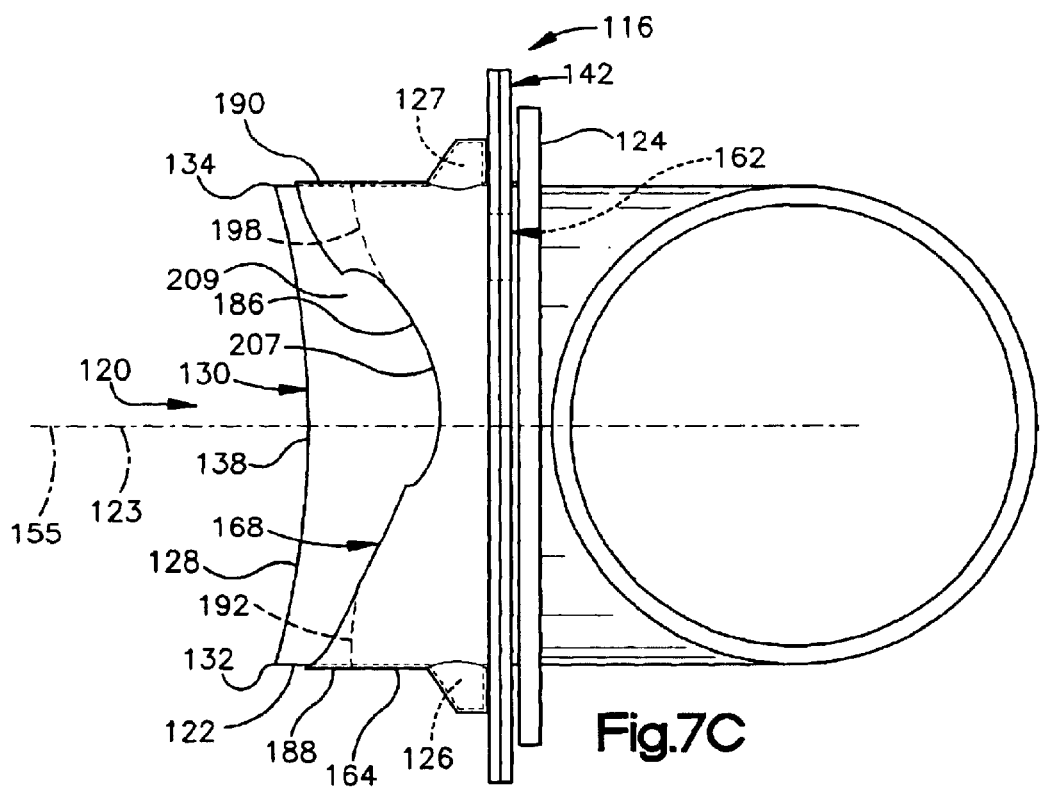
FIG. 7C is a bottom view of the apparatus of FIG. 6.
Figure 7D:
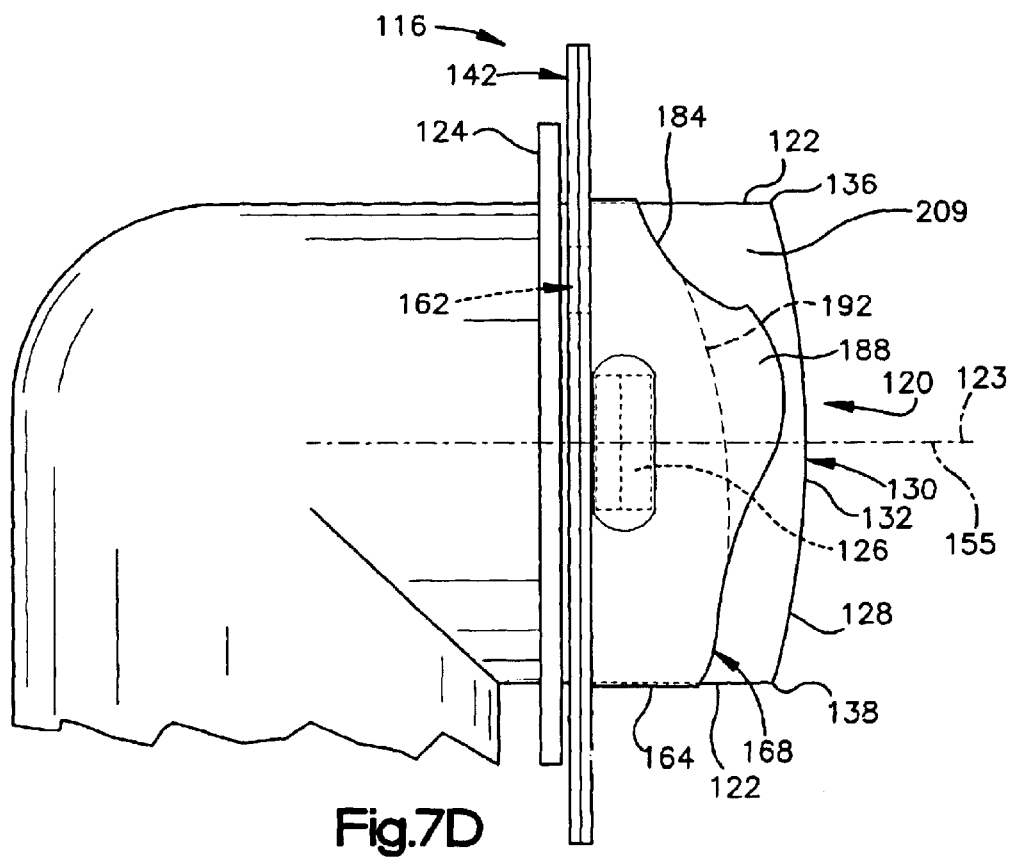
FIG. 7D is an opposite side view of the apparatus of FIG. 6.
Figure 7E:
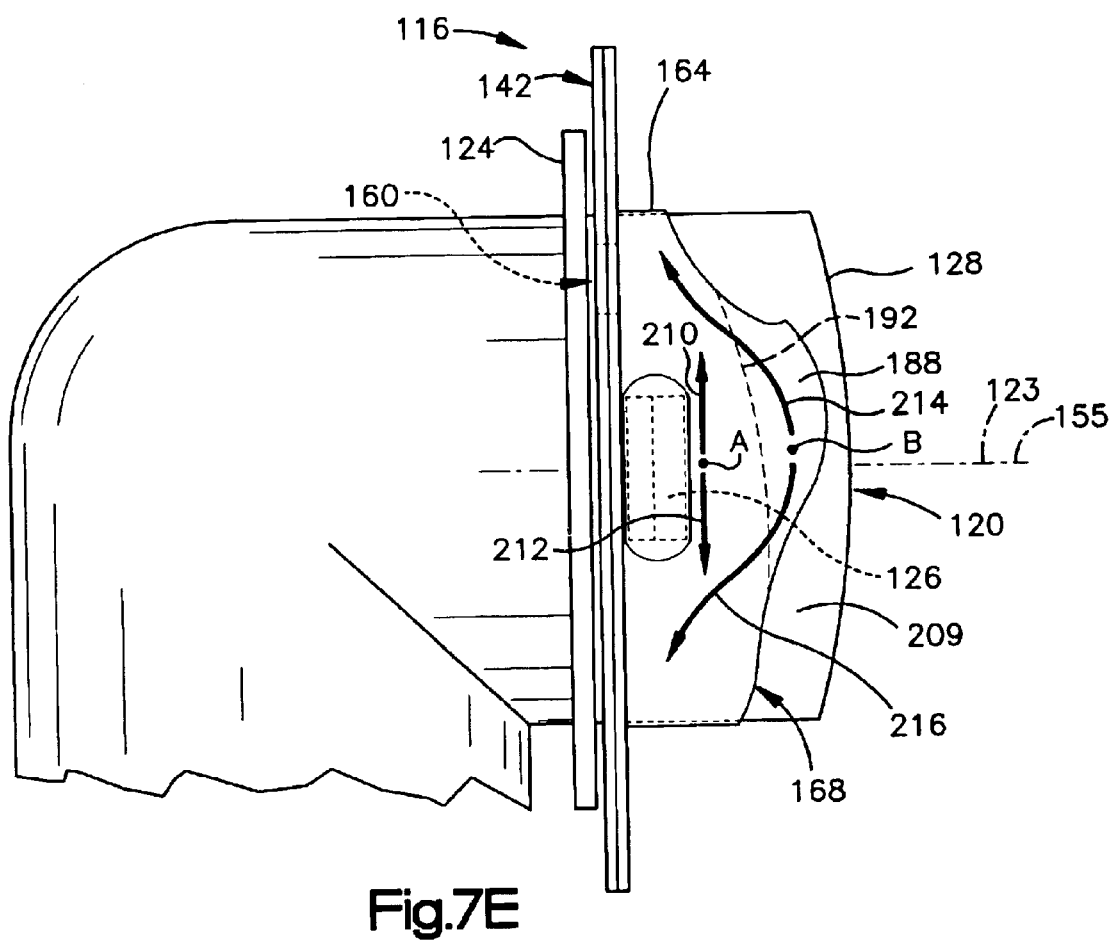
FIG. 7E is a view similar to that of FIG. 7D.

Referring to FIG. 7E, the effectiveness of the seal depends on how strongly the elastic force presses the diaphragm 164 against the tube 120. The elastic force is applied through lines of tension produced by the stretching of the diaphragm 164. For example, lines of tension 210 and 212 act on point A, which is on the diaphragm 164 but not on the lobe 188.

The lines of tension 210 and 212 are directed along the shortest path around the circumference of the tube 120. They thus pull the diaphragm 164 directly radially inward against the surface of the tube 120. Other lines of tension 214 and 216 act on point B, which is on the lobe 188. These lines of tension 214 and 216 are directed along an axially undulating path about the circumference of the tube 120. They thus pull the diaphragm 164 radially inward against the tube 120 more weakly than at point A.

This illustrates the fact that points on the diaphragm 164 that are on the lobe 188 engage the tube 120 with less force than do points that are off the lobe 188. Furthermore, for a given point on the lobe 188, the greater its distance from the baseline 192, the less forcefully it engages the tube 120. To ensure that all points on the lobe 188 form an effective seal, the height H (FIG. 5B) of the lobe 188 is shorter than the length L of the baseline 192 in the unstretched condition of the diaphragm 164.

In the present embodiment, shown in FIG. 7E, the entire area of the lobe 188 is stretched. Thus, the entire area of the lobe 188 is elastically pressed against the tube 120, thereby enhancing the seal. This desirable effect is due in part to the shape of the slit 171 in the unstretched condition shown in FIG. 5B. Specifically, the slit 171 does not extend into the lobe 188, as mentioned above. Additionally, as mentioned above, the opposite ends 172 and 174 of the slit 171 are the most distantly separated points of the slit 171. The slit 171 thus follows a path that does not turn back in on itself.

However, the edge 168 does turn back in on itself at each end 172 and 174 of the slit 171, as illustrated by the arrow 217. It does so, however, only along the fillet holes 176 and 178. Also, it does so to an extent that is sufficiently small such that the entire area of the lobe 188 is still stretched and elastically forced against the tube 120 (FIG. 7E). The extent to which the edge 168 turns back in on itself corresponds to the distance $D_3$. $D_3$ is measured parallel with the baseline 192, from the point 172 at which the edge 168 starts to turn back in on itself, to the point 218 at which the edge 168 is no longer turned inward.

As shown in FIG. 6, during operation of the vacuum cleaner, the dirt laden air enters the bag 110 through the fill tube 120, as indicated by the arrows 219. The air escapes through the bag 110 to the atmosphere, as indicated by the arrow 220, and the dirt is retained in the bag 110.

After operation of the vacuum cleaner, the bag assembly 110 can be removed from the vacuum cleaner. This is done by first rotating the fill tube 120 to move the projections 126 and 127 circumferentially into alignment with the notches 160 and 162. Next, the fill tube 120 is pulled out of the panel opening 117. As shown in FIG. 5B, the first and second sections 180 and 182 of the inner edge 168 of the diaphragm 164 come together to close the opening 170 in the unstretched condition. This inhibits dust in the bag 110 (FIG. 3) from escaping out through the opening 170.

The existence of the lobes 188 and 190 is a result of the slit 171 being nonlinear. Relative to a linear slit of equal length, the nonlinear slit 171 enables the fill tube 120 to be inserted more easily through the diaphragm opening 170. This is explained as follows. As the fill tube 120 (FIG. 6) is inserted in the linear slit, the edge surrounding the linear slit must expand from its original length to an expanded length equal the circumference of tube 120. In contrast, as the tube 120 is inserted in the arcuate slit 171 shown in FIG. 5B, the diaphragm 164 expands along a path defined by the two baselines 192 and 198 and two sections 222 and 224 of the inner edge 168 that extend from the first baseline 192 to the second baseline 198. The initial length of this path is longer than the initial length of the edge of the linear slit. Therefore, the edge 168 of the nonlinear slit 171 expands less when receiving the tube 120 than does the edge of the linear slit. The tube 120 is thus inserted through the nonlinear slit 171 more easily than through the linear slit of equal length.

Figure 8:
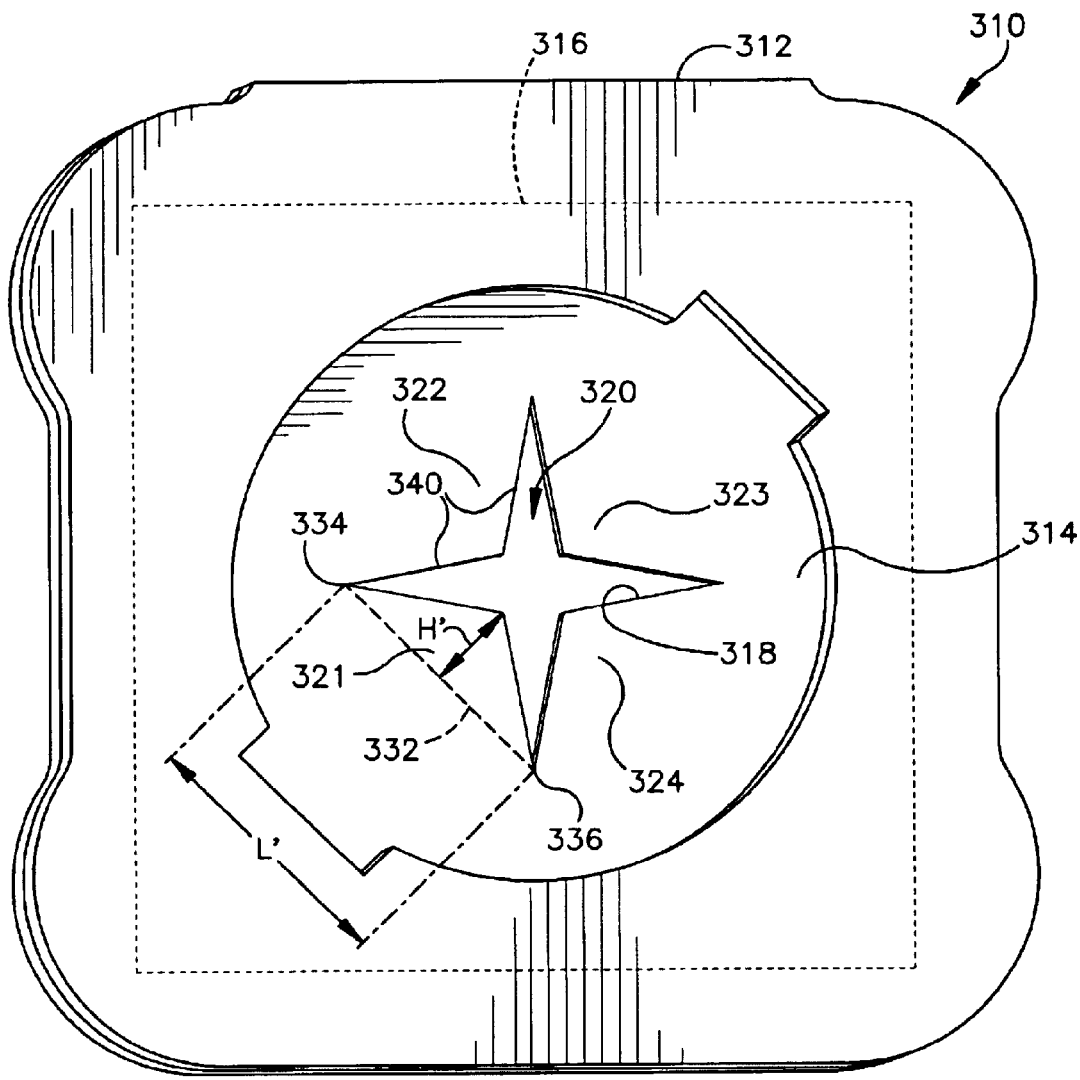
FIG. 8 is a front perspective view of an apparatus comprising a second embodiment of the invention.

FIG. 8 shows a mounting collar 310 comprising a second embodiment of the invention. This mounting collar 310 is similar to the mounting collar 116 of the first embodiment. As in the first embodiment, the collar 310 has a rigid panel 312 attached to a diaphragm 314. The diaphragm 314 has an outer edge 316. The diaphragm 314 also has an inner edge 318 defining an opening 320. Along the inner edge 318 are first, second, third and fourth lobes 321, 322, 323 and 324 of the diaphragm 314.

The four lobes 321, 322, 323 and 324 have the same size and shape and differ only in their orientations. They are described as follows with reference to the first lobe 321. The first lobe 321 is defined by the inner edge 318 and a straight baseline 332. The baseline 332 is located entirely on the diaphragm 314, extending from one point 334 on the inner edge 318 to another point 336 on the inner edge 318. Neither the baseline 332, nor an infinite line containing the baseline 332, extends across the opening 320. The height H' of the first lobe 321 is less than the length L' of the baseline 332. The distance between any two points on the inner edge 318 is less than the outer diameter $D_2$ (FIG. 6) of the outlet section 122 of the fill tube 120.

The second embodiment differs from the first embodiment in the following ways. The inner edge 318 of the second embodiment is not arcuate, but rather consists of eight linear segments 340. The diaphragm 314 has four lobes 321, 322, 323 and 324 instead of two. The lobes 321, 322, 323 and 324 do not engage each other along their lengths in the unstretched condition of the diaphragm 314.

Figure 9:
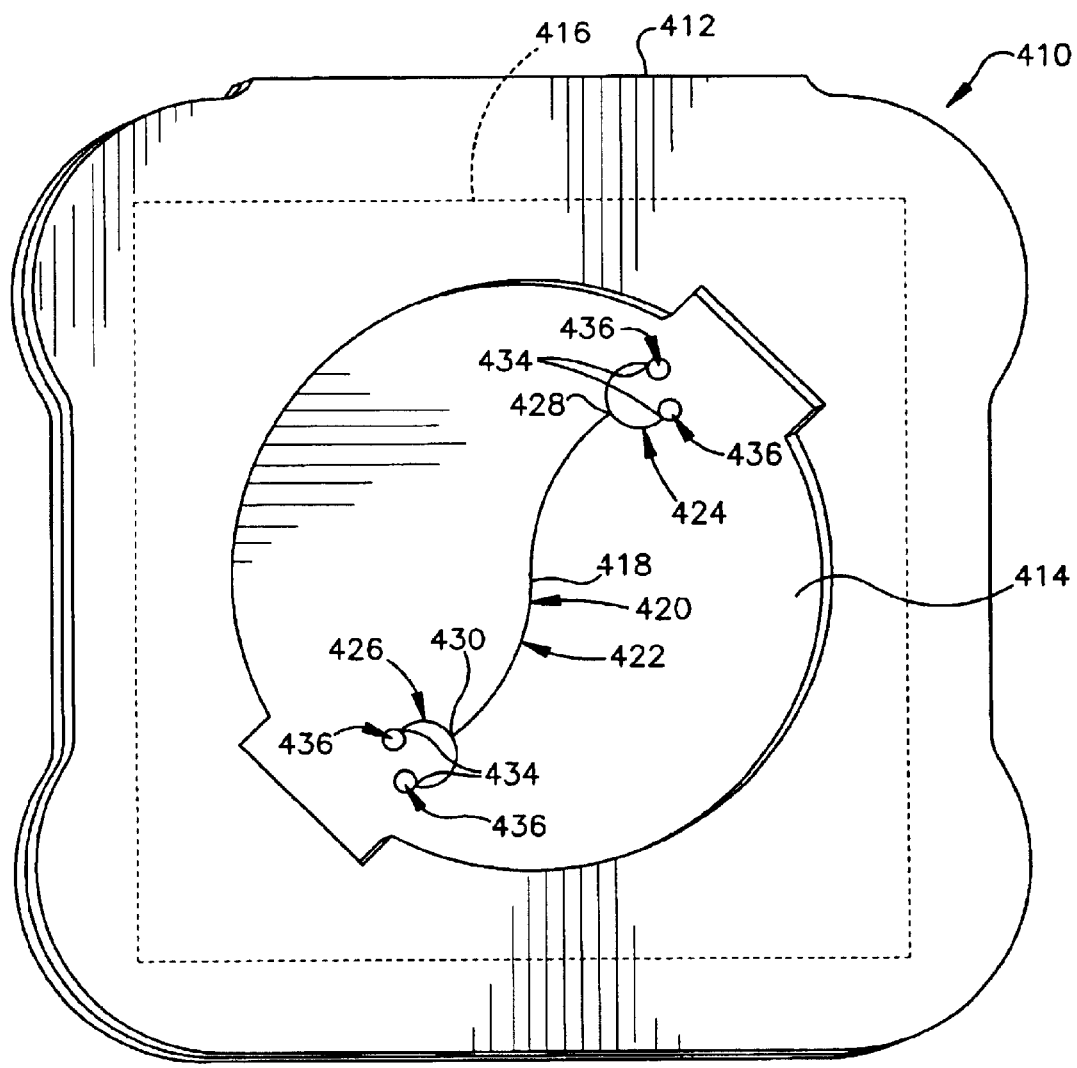
FIG. 9 is a front perspective view of an apparatus comprising a third embodiment of the invention.

FIG. 9 shows a mounting collar 410 comprising a third embodiment of the invention. This mounting collar 410 is similar to the mounting collar 116 of the first embodiment. As in the first embodiment, the collar 410 comprises a rigid panel 412 attached to a diaphragm 414. The diaphragm 414 has an outer edge 416. The diaphragm 412 also has an inner edge 418 defining an opening 420.

The third embodiment differs from the first embodiment in the number of slits defined by the inner edge 418. Specifically, the diaphragm 414 of the third embodiment has three intersecting slits: an S-shaped central slit 422 and two arcuate smaller slits 424 and 426 extending from opposite ends 428 and 430 of the central slit 422. This is in contrast to the diaphragm 164 of the first embodiment (FIG. 5A), which has only one slit 171. Each smaller slit 424 and 426 has two opposite ends 434. Adjoining each opposite end 434 is a round hole 436 in the diaphragm 414.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mounting collar for supporting a vacuum cleaner filter bag in a mounted condition over a vacuum cleaner fill tube, the fill tube having a cylindrical outer surface, said mounting collar comprising:

a panel configured to be attached to the filter bag and having a first inner edge defining a first opening for receiving the fill tube; and an elastomeric diaphragm extending across said first opening;

said diaphragm having a second inner edge defining a second opening that includes a slit, said second inner edge having an arcuate section and being configured to be elastically stretched circumferentially about the fill tube and to be in contact with the cylindrical outer surface about the entire circumference of the cylindrical outer surface when said first opening receives the fill tube;

said diaphragm further having a lobe defined by said arcuate section of said second inner edge and a baseline, said baseline extending from a first point on said second inner edge to a second point on said second inner edge and being located entirely on said diaphragm.

2. A mounting collar as defined in claim 1 wherein the distance between any two points on said inner edge is less than the diameter of the fill tube.

3. A mounting collar as defined in claim 1 wherein an infinite line containing said baseline does not extend across said second opening, and the height of said lobe is shorter than the length of said baseline in an original condition of said diaphragm.

4. A mounting collar as defined in claim 1 wherein the entire area of said lobe is stretched and elastically pressed against the tube when said first opening receives the fill tube.

5. A mounting collar as defined in claim 1 wherein said slit is defined by two sections of said edge that engage each other along their lengths in an original condition of said diaphragm.

6. A mounting collar as defined in claim 1 wherein said slit has two opposite ends, and said opposite ends are the most distantly separated locations on said slit.

7. A mounting collar as defined in claim 1 wherein an infinite line containing said baseline does not extend across said second opening, and said slit does not extend into said lobe.

8. A mounting collar as defined in claim 1 wherein said slit is one of a plurality of intersecting slits in said diaphragm.

9. A mounting collar as defined in claim 1 wherein said slit has two opposite ends, and said diaphragm further comprises a second slit extending from one of said opposite ends and a third slit extending from the other of said opposite ends.

10. A mounting collar for supporting a vacuum cleaner filter bag in a mounted condition over a vacuum cleaner fill tube, the fill tube having a cylindrical outer surface, said mounting collar comprising:

a panel configured to be attached to the filter bag and having a first inner edge defining a first opening for receiving the fill tube; and an elastomeric diaphragm extending across said first opening;

said diaphragm having a second inner edge defining an arcuate slit, said second inner edge being configured to be elastically stretched circumferentially about the fill tube when said first opening receives the fill tube; and said diaphragm further having a lobe into which said slit does not extend, said lobe being defined by said second inner edge and a baseline, said baseline extending from a first point on said second inner edge to a second point on said second inner edge, said baseline being located entirely on said diaphragm and oriented such that an infinite line containing said baseline does not extend across said second opening.

11. A mounting collar as defined in claim 10 wherein said slit has two opposite ends, and said opposite ends are the most distantly separated points of said slit.

12. A mounting collar for supporting a vacuum cleaner filter bag in a mounted condition over a vacuum cleaner fill tube, the fill tube having a cylindrical outer surface, said mounting collar comprising:

a panel configured to be attached to the filter bag and having a first inner edge defining a first opening for receiving the fill tube; and an elastomeric diaphragm extending across said first opening;

said diaphragm having a second inner edge defining an S-shaped slit, and said slit having two opposite ends, which are the most distantly separated points on said slit; and said second inner edge being configured to be elastically stretched circumferentially about the fill tube when first opening receives the fill tube.

13. A mounting collar as defined in claim 12 wherein said second edge is configured to be in contact with the cylindrical outer surface about the entire circumference of the cylindrical outer surface when said first opening receives the fill tube.

14. A mounting collar as defined in claim 12 wherein said diaphragm has a lobe defined by said second inner edge and a baseline, said baseline extending from a first point on said second inner edge to a second point on said second inner edge such that an infinite line containing said baseline does not extend across said second opening, and the height of said lobe is shorter than the length of said baseline in an original condition of said diaphragm.

15. A mounting collar as defined in claim 12 wherein said slit is defined by two sections of said edge that engage each other along their lengths in an original condition of said diaphragm.

16. A mounting collar as defined in claim 12 wherein said slit is one of a plurality of intersecting slits in said diaphragm.

17. A mounting collar as defined in claim 12 wherein said slit has two opposite ends, and said diaphragm further comprises a second slit extending from one of said opposite ends and a third slit extending from, the other of said opposite ends.

18. A mounting collar as defined in claim 12 wherein said slit follows a path that does not turnback in on itself.

* * * * *

UNITED STATES PATENT AND TRADEMARK OFFICE
CERTIFICATE OF CORRECTION

PATENT NO. : 6,716,262 B2
DATED : April 6, 2004
INVENTOR(S) : Daniel B. Zimet and Martin Warchola It is certified that error appears in the above-identified patent and that said Letters Patent is hereby corrected as shown below:

Column 7,
Line 2, change "baying" to -- having --

Column 8,
Line 58, change "turnback" to -- turn back --

Signed and Sealed this

Fifteenth Day of March, 2005

JON W. DUDAS
*Director of the United States Patent and Trademark Office*